(12) United States Patent
Travis

(10) Patent No.: US 8,616,818 B2
(45) Date of Patent: Dec. 31, 2013

(54) GRIPPING WASHER HAVING ONE OR MORE DEFORMABLE GRIPPING TABS AND METHOD FOR REDUCING FOREIGN OBJECT DEBRIS

(75) Inventor: Robert D. Travis, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 222 days.

(21) Appl. No.: 13/029,744

(22) Filed: Feb. 17, 2011

(65) Prior Publication Data

US 2012/0213611 A1    Aug. 23, 2012

(51) Int. Cl.
 *F16B 43/00* (2006.01)
(52) U.S. Cl.
 USPC ......... 411/533; 411/371.1; 411/531; 411/542
(58) Field of Classification Search
 USPC ........... 411/368, 371.1, 371.2, 512, 531, 533, 411/539, 542; 470/3
 See application file for complete search history.

(56) References Cited

U.S. PATENT DOCUMENTS

| 949,658 A | 2/1910 | Randall |
|---|---|---|
| 1,157,574 A | 10/1915 | Mueller |
| 1,208,620 A | 12/1916 | Moser |
| 1,487,610 A | 3/1924 | Schatzel |
| 1,908,215 A | 5/1933 | Berge |
| 1,945,005 A | 1/1934 | Vacher |
| 2,113,424 A | 4/1938 | Crowther |
| 2,113,425 A | 4/1938 | Crowther |
| 2,192,322 A | 3/1940 | Mitchell |
| 2,225,654 A | 12/1940 | Olson |
| 2,270,813 A | 1/1942 | Olson |
| 2,283,494 A | 5/1942 | Erdman |
| 2,303,224 A | 11/1942 | Olson |
| 2,424,208 A | 7/1947 | Poupitch |
| 2,439,306 A | 4/1948 | Laidley |
| 2,492,115 A | 12/1949 | Crowther |
| 2,537,575 A | 1/1951 | Crowther |
| 2,552,004 A | 5/1951 | Erdman |

(Continued)

FOREIGN PATENT DOCUMENTS

WO    WO-2012/112207 A1    8/2012

OTHER PUBLICATIONS

"International Application No. PCT/US2011/064901, International Search Report mailed Apr. 25, 2012", 2 pgs.

(Continued)

*Primary Examiner* — Roberta Delisle
(74) *Attorney, Agent, or Firm* — Schwegman, Lundberg & Woessner, P.A.

(57) ABSTRACT

A gripping washer includes a washer body having first and second rigid support surfaces. A fastener hole extends between the first and second rigid support surfaces. An inner washer perimeter extends around the fastener hole. One or more elastomeric gripping tabs are coupled with the inner washer perimeter. The one or more elastomeric gripping tabs extend inwardly into the fastener hole from the inner washer perimeter. The elastomeric gripping tabs are pliable relative to the first and second rigid support surfaces of the washer body and deform and grip the washer with a fastener passed through the fastener hole. By gripping a fastener with the elastomeric gripping tabs the gripping washer is anchored to the fastener and substantially prevents decoupling of the gripping washer from the fastener prior to installation (e.g., fastening with a work piece). Gripping of the fastener with the gripping washer thereby minimizes foreign object debris.

36 Claims, 6 Drawing Sheets

(56) References Cited

U.S. PATENT DOCUMENTS

| | | |
|---|---|---|
| 2,619,145 A | 11/1952 | Poupitch |
| 2,672,069 A | 3/1954 | Mitchell |
| 2,708,956 A | 5/1955 | Poupitch |
| 2,709,470 A | 5/1955 | Knohl |
| 2,746,506 A | 5/1956 | Poupitch |
| 2,761,347 A | 9/1956 | McKee, Jr. |
| 2,761,484 A | 9/1956 | Sternick |
| 2,779,375 A | 1/1957 | O'Connor |
| 2,779,376 A | 1/1957 | Poupitch |
| 2,941,105 A | 6/1960 | Rickenbach |
| 3,032,089 A | 5/1962 | Gutshall |
| 3,037,221 A | 6/1962 | Lanius, Jr. |
| 3,062,557 A | 11/1962 | Underwood |
| 3,099,456 A | 7/1963 | Hopp |
| 3,144,803 A | 8/1964 | Briles |
| 3,156,281 A | 11/1964 | Demi |
| 3,163,196 A | 12/1964 | Hanneman |
| 3,170,701 A | 2/1965 | Hoover |
| 3,181,584 A | 5/1965 | Borowsky |
| 3,218,906 A | 11/1965 | Dupree |
| 3,221,792 A | 12/1965 | Poupitch |
| 3,259,404 A | 7/1966 | Papenguth |
| 3,304,562 A | 2/1967 | Schmidt |
| 3,342,235 A | 9/1967 | Pylypyshyn |
| 3,362,737 A * | 1/1968 | Cobb .............................. 403/373 |
| 3,421,563 A | 1/1969 | Koss |
| 3,434,520 A | 3/1969 | Bedford, Jr. |
| 3,628,584 A | 12/1971 | Gutshall |
| 3,659,491 A | 5/1972 | Duffy et al. |
| 3,726,178 A | 4/1973 | Dimitry |
| 3,777,796 A | 12/1973 | Takano |
| 3,816,820 A | 6/1974 | Stanaitis |
| 3,856,066 A | 12/1974 | Reynolds |
| 3,862,458 A | 1/1975 | Stanaitis |
| 3,872,530 A | 3/1975 | Festerling |
| 3,913,649 A | 10/1975 | Stanaitis |
| 3,948,532 A | 4/1976 | Hopp |
| 3,967,875 A | 7/1976 | Stanaitis |
| 3,971,086 A | 7/1976 | Stanaitis |
| 3,978,761 A | 9/1976 | Sosinski |
| 3,981,170 A | 9/1976 | Barth et al. |
| 4,123,132 A | 10/1978 | Hardy et al. |
| 4,157,725 A | 6/1979 | Stanaitis |
| 4,191,389 A | 3/1980 | Jelinek |
| 4,241,491 A | 12/1980 | Hopp |
| 4,292,007 A | 9/1981 | Wagner |
| 4,300,866 A | 11/1981 | Fisher et al. |
| 4,309,787 A | 1/1982 | Lapohn |
| 4,362,449 A | 12/1982 | Hlinsky |
| 4,431,353 A | 2/1984 | Capuano |
| 4,435,112 A | 3/1984 | Becker |
| 4,462,730 A | 7/1984 | Knohl |
| 4,702,657 A | 10/1987 | Jelinek |
| 4,732,519 A | 3/1988 | Wagner |
| 4,793,757 A | 12/1988 | Peterson |
| 4,865,335 A | 9/1989 | McGann |
| 4,875,818 A | 10/1989 | Reinwall |
| 4,900,209 A | 2/1990 | Reynolds |
| 4,986,712 A | 1/1991 | Fultz |
| 5,082,407 A | 1/1992 | Mickiewicz |
| 5,090,855 A | 2/1992 | Terry |
| 5,308,285 A | 5/1994 | Malen et al. |
| 5,489,177 A | 2/1996 | Schmidt, Jr. |
| 5,496,142 A | 3/1996 | Fodor et al. |
| 5,544,902 A | 8/1996 | Belter |
| 5,688,091 A | 11/1997 | McKinlay |
| 5,711,711 A | 1/1998 | Schmidt, Jr. |
| 5,791,660 A | 8/1998 | Belter |
| 5,829,933 A | 11/1998 | Kramer |
| 6,059,503 A | 5/2000 | Johnson |
| 6,173,969 B1 * | 1/2001 | Stoll et al. ..................... 277/630 |
| 7,083,372 B2 | 8/2006 | Winker |
| 7,207,762 B2 * | 4/2007 | Teal .............................. 411/526 |
| 7,261,506 B2 | 8/2007 | Smolarek |
| 7,306,418 B2 | 12/2007 | Kornblum |
| 7,326,017 B2 | 2/2008 | Winker |
| 7,686,554 B2 * | 3/2010 | Amann et al. ................. 411/352 |
| 7,950,886 B2 * | 5/2011 | Siegal ............................ 411/107 |
| 2008/0145179 A1 * | 6/2008 | Amann et al. ................. 411/378 |

OTHER PUBLICATIONS

"International Application No. PCT/US2011/064901, Written Opinion mailed Apr. 25, 2012", 8 pgs.

"International Application Serial No. PCT/US2011/064901, International Preliminary Report on Patentability mailed Aug. 29, 2013", 10 pgs.

* cited by examiner

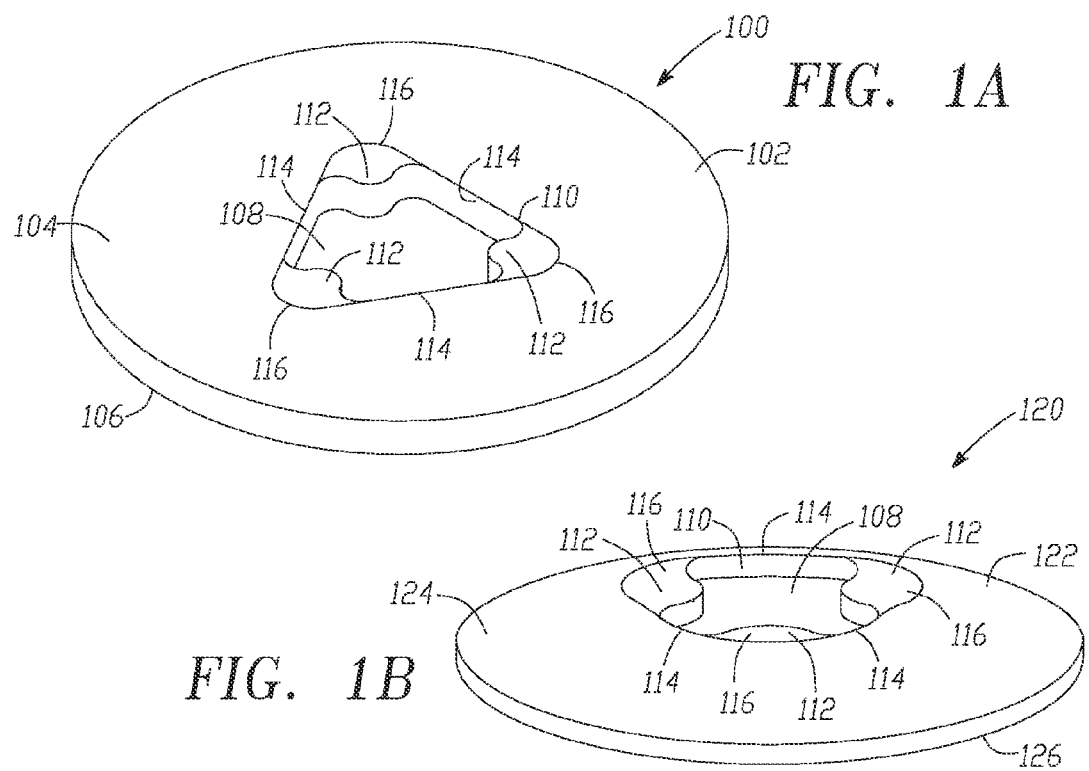
FIG. 1A
FIG. 1B
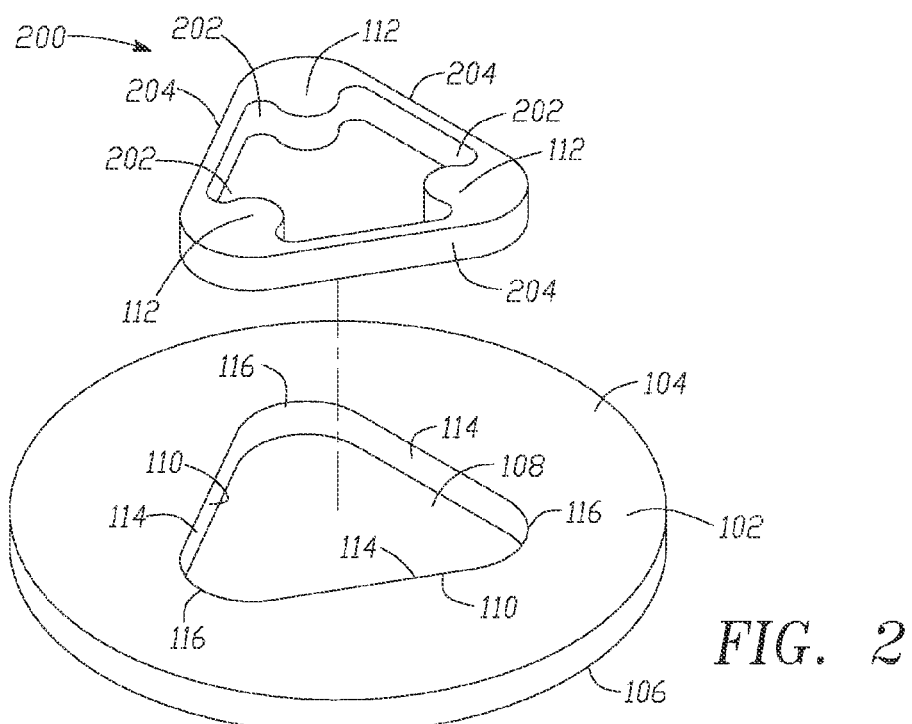
FIG. 2

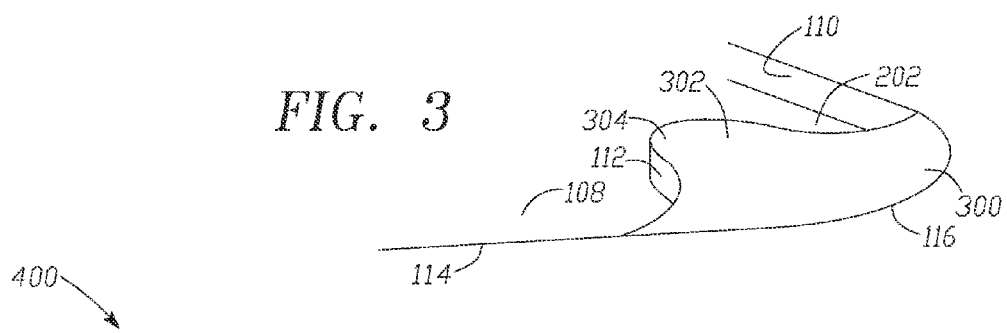
FIG. 3
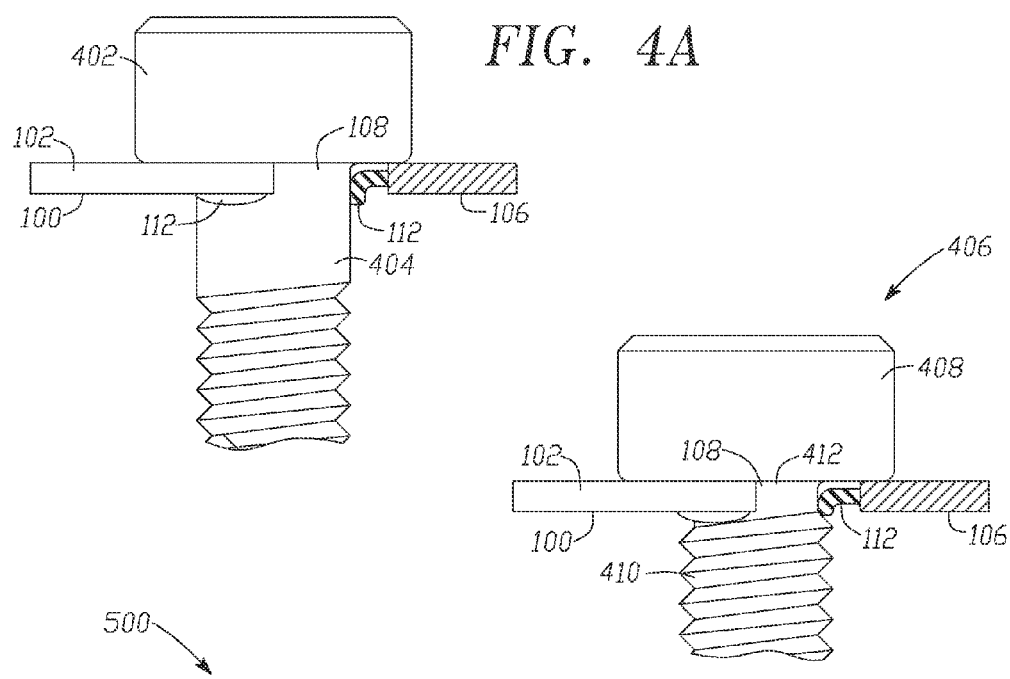
FIG. 4A
FIG. 4B
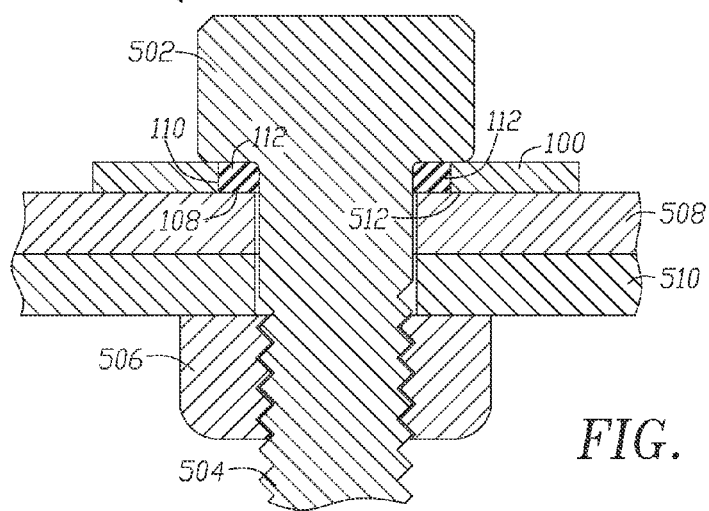
FIG. 5

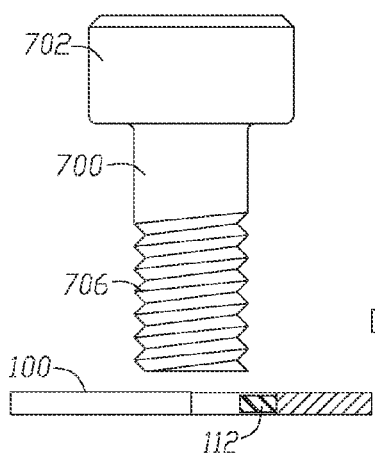
FIG. 7A
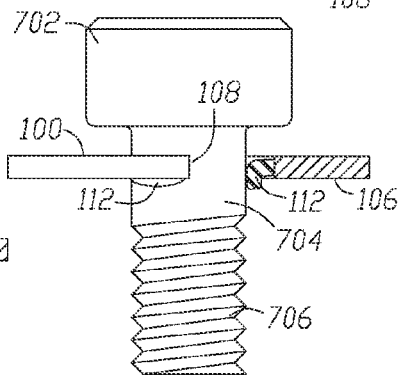
FIG. 7B
FIG. 7C
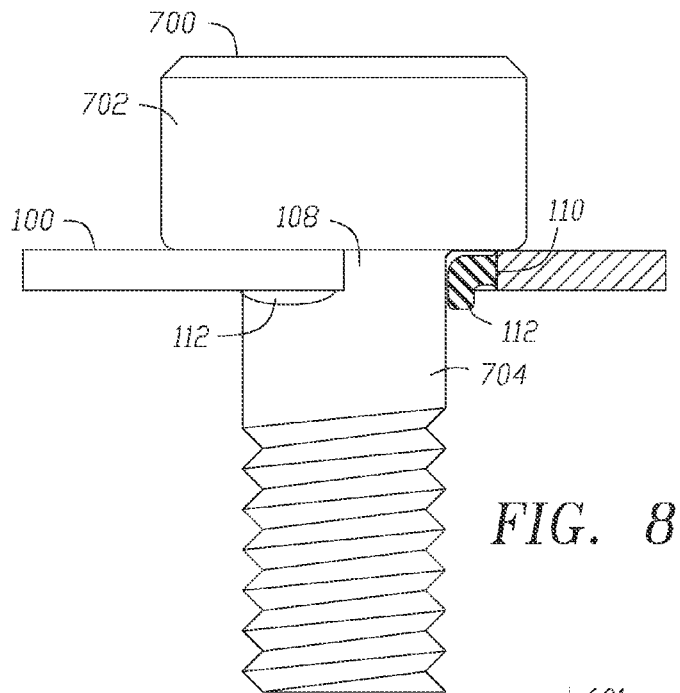
FIG. 8
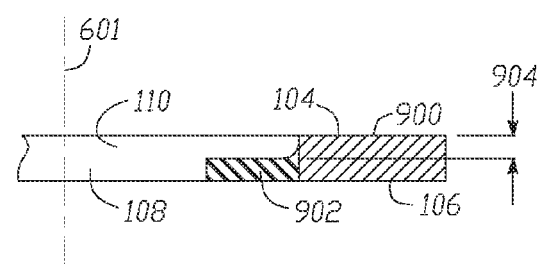
FIG. 9A pedigrees that would follow the preassembled combinations through manufacturing and assembly.

GRIPPING WASHER HAVING ONE OR MORE DEFORMABLE GRIPPING TABS AND METHOD FOR REDUCING FOREIGN OBJECT DEBRIS

TECHNICAL FIELD

Embodiments pertain to washers and washer and fastener combinations. Some embodiments pertain to gripping washers and methods for reducing foreign object debris (FOD).

BACKGROUND

Loose washers used with fasteners are misplaced within hardware assemblies in the aerospace industry. In some examples the hardware assemblies are subjected to extreme accelerations, changes in momentum and the like (e.g., in rocket propelled, satellite and other applications). Loose washers within these expensive assemblies become Foreign Object Debris (FOD). When accelerated and decelerated, especially in the case of rocket propelled electronics and other hardware, loose washers may cause extensive damage (e.g., through physical impact, as a fire or electrical hazard and the like) to hardware resulting in limited usability or outright failure of a device. Further, loose washers are hazards at times during assembly. Interaction between washers and assembly tools may create fire and electrical hazards with the risk of damaging or destroying sensitive hardware components. Even where washers are preassembled on fasteners (e.g., positioned along the fastener shaft or shank) there is a risk that delivery of the fastener to a location within the hardware will decouple the washer and create FOD. Disassembly of hardware to locate and retrieve washers is time consuming and expensive, and often results in uncertainty with regard to hardware quality and reliability.

Further, the assembly of washers with fasteners in the aerospace industry is often performed in a clean room with skilled and expensive manufacturing technicians. The assembly of washers and fasteners in such an environment is tedious and labor intensive, with technicians' level of difficulty increased by need to wear protective clothing such as rubber gloves or finger cots, surgical masks and the like. In some examples, using less expensive personnel and non-clean environments are not options as strict quality standards are required for assembly of the components used in the hardware.

In other industries, such as the automotive and electronics industries, preassembled washers and fasteners (SEMS) are used to facilitate efficiency in assembly. SEMS are preassembled by passing an unfinished fastener through a washer and thereafter deforming the fastener in another manufacturing step. For instance, as threading is formed on the fastener shaft (through dies, for example) the shaft is deformed and expands to engage with the washer. In some examples, the deformation of the fastener similarly deforms the washer and alters the physical properties of the fastener and washer including, but not limited to, the structural bearing of the washer, the torque needed to fastener the fastener and the like. Additionally, preassembled washer and fastener combinations in the aerospace industry require separate catalog entries and separate quality pedigrees for each of the permutations of the fastener, the washer and the fastener/washer combination. Stated another way, in the tightly controlled manufacturing and assembly processes of the aerospace industry the addition of preassembled fastener and washer combinations would require extensive rework or addition to product catalogs with corresponding development of quality pedigrees that would follow the preassembled combinations through manufacturing and assembly.

SUMMARY

In accordance with some embodiments, a gripping washer and a method for using the same is discussed that facilitates the coupling of the gripping washer with a fastener and reliably retains the gripping washer along the fastener. Foreign Object Debris within hardware is thereby minimized, attendant costs, for instance from disassembly of hardware to retrieve lost washers are avoided, and overall product quality assurance is increased. The assembly of the gripping washer with the fastener may be performed on site and precision cleaned to move washer and fastener assembly out of the clean room and away from expensive technician handling.

Moreover, the gripping washer equivalent to a standard specified washer is readily usable with the full series of fasteners within a fastener class specified for the standard washer type. That is to say, the gripping washer is configured to grip all fasteners within a fastener class irrespective of changes in size and shaft configuration (e.g., a bare unworked shaft, underfilled head, threading and the like). Further, the gripping washer grips fasteners without altering the physical and mechanical characteristics of the washer or the fastener. The washer supports the entire perimeter of the fastener head and the fastener and washer are not deformed through engagement between the fastener and the washer. Further, elastomeric gripping tabs do not substantially alter the torque needed to fasten the fastener with work pieces. A technician using the gripping washer with a fastener thereby provides the same torque to fasten with a standard washer and the gripping washer. Other features and advantages will become apparent from the following description of the embodiments, which description should be taken in conjunction with the accompanying drawings.

BRIEF DESCRIPTION OF THE DRAWINGS

A more complete understanding of the present subject matter may be derived by referring to the detailed description and claims when considered in connection with the following illustrative Figures. In the following Figures, like reference numbers refer to similar elements and steps throughout the Figures.

FIG. 1A is a perspective view showing one example of a gripping washer including a flat washer body.

FIG. 1B is a perspective view showing another example of a gripping washer including a conical washer body.

FIG. 2 is an exploded view of another example of a gripping washer.

FIG. 3 is a detailed perspective view of an elastomeric gripping tab.

FIG. 4A is a perspective view of the gripping washer of FIG. 1A in a gripping configuration along an unworked shank.

FIG. 4B is a perspective view of the gripping washer of FIG. 1A in a gripping configuration in a recessed transition zone of a threaded shank.

FIG. 5 is a cross sectional view of the gripping washer of FIG. 1A in a fastened configuration with the elastomeric gripping tabs received within the fastener hole of the washer body.

FIGS. 7A-C are side views of a gripping washer and a fastener in uninstalled, intermediate and gripping configurations, respectively.

FIG. 8 is a detailed side view of the gripping washer and fastener of FIG. 7C in the gripping configuration.

FIG. 9A is a detailed partial cross sectional view of a portion of a gripping washer with an elastomeric gripping tab positioned adjacent to one of the washer support surfaces.

Figure 6A:
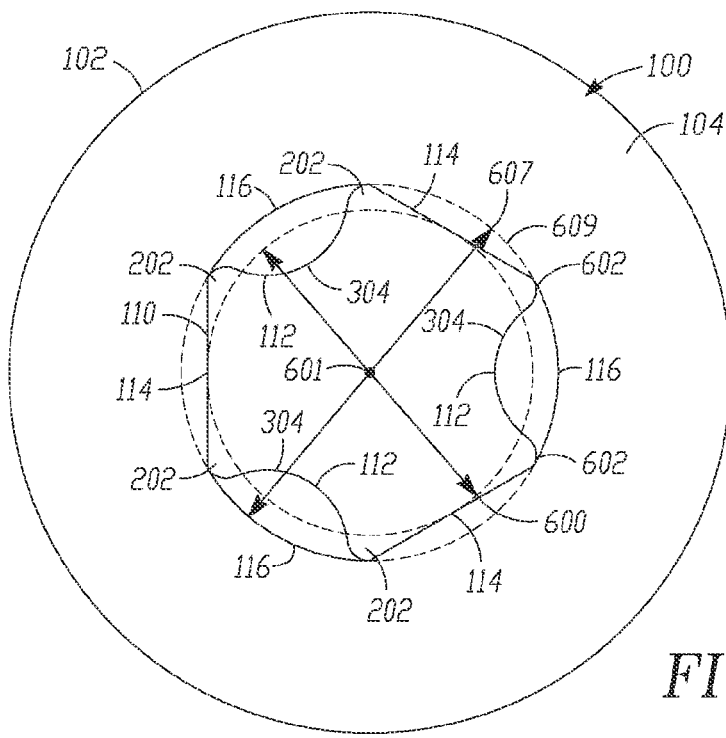
FIG. 6A is a top view of one example of a gripping washer including one or more elastomeric gripping tabs formed in recess arcs.

Elements and steps in the Figures are illustrated for simplicity and clarity and have not necessarily been rendered according to any particular sequence. For example, steps that may be performed concurrently or in different order are illustrated in the Figures to help to improve understanding of examples of the present subject matter.

DESCRIPTION OF THE DRAWINGS

In the following detailed description, reference is made to the accompanying drawings which form a part hereof, and in which is shown by way of illustration specific examples in which the subject matter may be practiced. These examples are described in sufficient detail to enable those skilled in the art to practice the subject matter, and it is to be understood that other examples may be utilized and that structural changes may be made without departing from the scope of the present subject matter. Therefore, the following detailed description is not to be taken in a limiting sense, and the scope of the present subject matter is defined by the appended claims and their equivalents.

The present subject matter may be described in terms of functional block components and various processing steps. Such functional blocks may be realized by any number of techniques, technologies, and methods configured to perform the specified functions and achieve the various results. For example, the present subject matter may employ various materials and the like, which may carry out a variety of functions. In addition, the present subject matter may be practiced in conjunction with any number of devices, and the systems described are merely exemplary applications.

FIGS. 1A and 1B shown two examples of gripping washers 100, 120 including elastomeric gripping tabs 112 sized and shaped to engage and retain the gripping washers 100, 120 along a fastener shaft (e.g., a shank). Referring first to FIG. 1A, the gripping washer 100 includes a washer body 102, for instance, a flat washer body. The washer body 102 includes a first rigid support surface 104 and a second opposed rigid support surface 106. The washer body 102 with the first and second rigid support surfaces 104, 106 provides a structural support for a fastener extending through the gripping washer 100 and distributes the fastening load of the fastener over the surface area of the gripping washer 100, for instance, to a work piece underlying the gripping washer 100.

As shown in FIG. 1A, the gripping washer 100 includes a fastener hole 108 including an inner washer perimeter 110. As shown in FIGS. 1A and 1B, the fastener hole 108 is formed with one or more facets 114 and recess arcs 116 interposed between the facets 114 shown in each of the figures. The fastener hole 108 with the facets 114 and the recess arcs 116 provides a non-circular shape. For instance, as shown in FIG. 1A, the shape of the fastener hole 108 is triangular with rounded corners formed with the recess arcs 116. If the gripping washer is being used with a fastener having a large perimeter head, such as a hex head bolt, those rounded corners may be tangent with triangle faces. Such a fastener hole would however be exposed if gripping washer were used with a fastener having a smaller head diameter, such as a socket head cap screw or a fillister head machine screw. To facilitate usage with smaller head diameter fasteners, the rounded corners are truncated to lie within a diameter substantially smaller than the fastener head diameter. As will be described in further detail below, the inner washer perimeter 110 formed by the facets 114 is sized and shaped to receive one or more fasteners within a specified fastener class corresponding to the specifications for the standard washer (e.g., no elastomeric gripping tabs 112, facets 114 or the like) equivalent to the gripping washer 100. Stated another way, the fastener hole 108 is sized sufficiently large at its smallest internal size to receive fasteners from a specified fastening class corresponding to the equivalent size of the gripping washer 100 (e.g., a washer having a typical circular hole) while still being able to grip any one of the fasteners within the fastener hole 108, and concurrently fastener hole 108 is also sized sufficiently small at its largest external size such that it is fully covered by the head of fastener being installed.

Referring again to FIG. 1A, the gripping washer 100 further includes a plurality of elastomeric gripping tabs 112 extending into the fastener hole 108 from the inner washer perimeter 110. As shown in FIG. 1A, the elastomeric gripping tabs 112 are positioned in one example within the recess arcs 116. Optionally, the elastomeric gripping tabs 112 are positioned in each of the recess arcs 116. In still another option, one or more elastomeric gripping tabs 112 are positioned in one or fewer than all of the recess arcs 116 within the gripping washer 100. In one example, the elastomeric gripping tabs 112 are coupled with the inner washer perimeter 110 through molding of the tabs onto the inner washer perimeter 110. In another example, the elastomeric gripping tabs 112 are coupled with but not limited to adhesives, welds, mechanical fittings and the like with the inner washer perimeter 110.

In another example, the elastomeric gripping tabs are constructed with but not limited to deformable materials having pliability greater than the pliability of the washer body 102. For instance, the elastomeric gripping tabs 112 are formed with, but not limited to, butyl rubber and thereafter coupled with the inner washer perimeter 110. The washer body 102 including the inner washer perimeter is constructed with metal, such as carbon steel, stainless steel and the like. Elastomeric gripping tabs 112 have a greater deformability relative to the washer body 102 and are thereby able to easily deform and engage with fastener shafts (e.g., shanks) fed through the fastener hole 108.

The elastomeric gripping tabs 112 are positioned in the recess arcs 116 the example shown in FIG. 1A to recess the elastomeric gripping tabs from the interior of the fastener hole 108. The fastener hole 108 is thereby left open to receive one or more of a variety of fasteners having shaft diameters within a specified class of fasteners for a standard washer equivalent to the gripping washer 100. As the shank of the fastener passes through the fastener hole 108 the elastomeric gripping tabs 112 deform and engage along the shank. The pliable nature of the elastomeric gripping tabs 112 allows for the gripping tabs 112 to engage substantially any surface on the shank, for instance, a bare shaft shank, threads, under fill areas beneath fastener heads and the like. As will be described in further detail below, deformation of the elastomeric gripping tabs 112 deforms the tabs outside of the fastener hole 108, for instance, below the second rigid support surface 106. Because of the deformable character of the gripping tabs 112 the tabs are easily deflected back into the fastener hole 108 during fastening of a fastener utilizing the gripping washer 100.

FIG. 1B shows another example of a gripping washer, such as a conical gripping washer 120, in uninstalled condition. In a similar manner to the gripping washer 100, the conical gripping washer 120 includes a conical washer body 122 and the fastener hole 108 corresponding to the fastener hole 108 shown in FIG. 1A extends through the conical washer body 122. The conical washer body 122 includes a first support surface 124 and a second support surface 126. The washer in this example is typically used to provide spring force in a fastened joint, and as such, the starting conic geometry is flattened out as the screw is tightened. In the installed condition, as previously described above, the first and second support surfaces 124, 126 are effectively rigid once the screw is tightened and act to distribute forces from a fastener head engaged along one of the support surfaces to the opposed supporting surface.

FIG. 1B shows a conical gripping washer 120 in uninstalled condition with elastomeric gripping tabs 112, facets 114 and recess arcs 116. These features are similarly applicable to other washer types including but not limited to wave washer bodies, curved-disk washer bodies, one piece spherical washer bodies and two piece spherical washer bodies, locking washer bodies and the like. The elastomeric gripping tabs 112, the facets 114 and the recess arcs 116 are applicable to any and all washer designs including a fastener hole or recess (in the case of a washer including a broken perimeter).

The conical gripping washer 120 in a similar manner to the gripping washer 100 includes an inner washer perimeter 110 including facets and recess arcs 114, 116, respectively. The elastomeric gripping tabs 112 are positioned within the recess arcs 116. The elastomeric gripping tabs 112 are pliable and configured to engage with and retain fasteners disposed within the fastener hole 108. That is to say the elastomeric gripping tabs 112 used with the conical gripping washer 120 operate and perform similarly to the elastomeric gripping tabs 112 shown for the gripping washer 100 having the flat washer body 102 (e.g., the tabs 112 deflect and grip the fastener shank).

FIG. 2 shows another example of a gripping washer 100 including an optional gripping tab support 200. The gripping washer 100 shown in FIG. 2 is similar to the previously described gripping washers and includes a washer body 102 having first and second rigid support surfaces 104, 106. The fastener hole 108 is defined by the inner washer perimeter 110 including the plurality of facets 114 and interposing recess arcs 116. As previously described and shown in FIGS. 1A and 1B, the gripping washer 100 includes a plurality of elastomeric gripping tabs 112 positioned within the recess arcs 116.

In the example shown in FIG. 2, the gripping washer 100 includes the gripping tab support 200 including the elastomeric gripping tabs 112 positioned thereon. The gripping tab support assists in formation of the elastomeric gripping tabs 112 and positioning of the tabs within the fastener hole 108, and is entirely optional. As shown the gripping tab support 200 includes one or more support branches 204 extending between each of the elastomeric gripping tabs 112. The support branches 204 provide a skeletal structure to the gripping tab support 200 sized and shaped for positioning within the fastener hole 108 and engagement along the inner washer perimeter 110. In one example, the gripping tab support 200 is coupled with the inner washer perimeter 110, for instance, by molding the gripping tab support 200 there along. In another example, the gripping tab support 200 is coupled with the inner washer perimeter 110 through adhesives, mechanical fasteners and the like. As shown in FIG. 2, a plurality of deformation wells 202 are disposed to either side of each of the elastomeric gripping tabs 112. As will be described in further detail below, the deformation wells 202 provide recesses adjacent to the elastomeric gripping tabs 112 to facilitate the deformation and reception of the elastomeric gripping tabs 112 within the fastener hole 108 during fastening with a fastener engaged with the gripping washer 100 and coupled with a work piece. The deformation wells 202 facilitate the reception of the elastomeric gripping tabs 112 during fastening thereby ensure the elastomeric gripping tabs 112 have substantially no effect on forces such as torque required to rotate the fastener relative to the work piece and to fix the fastener to the work piece.

FIG. 3 shows a detailed perspective view of an elastomeric gripping tab 112 positioned within a recess arc 116 of a fastener hole 108. In the example shown in FIG. 3, the elastomeric gripping tab 112 is directly coupled with the inner washer perimeter 110 (for instance, without the optional gripping tab support 200 shown in FIG. 2). The elastomeric gripping tab 112 shown in FIG. 3 is similar in many regards to the elastomeric gripping tabs previously described with the gripping washers 100, 120 (shown in FIGS. 1A, 1B and 2). As previously described, the elastomeric gripping tab 112 is constructed with a deformable and pliable material relative to the stiff and structurally robust material used in the washer body 102. For instance, the elastomeric gripping tab 112 is constructed with, but not limited to, butyl rubber. As shown in FIG. 3, the elastomeric gripping tab 112 includes a base 300, coupled along the inner washer perimeter 110 and a gripping tip 304 positioned within the fastener hole 108. The gripping tip 304 of the elastomeric gripping tab 112 is coupled with the base 300 by a tab arm 302 extending therebetween. The tab arm 302 is sized and shaped to position the gripping tip 304 within the fastener hole 108 to ensure engagement of the gripping tip 304 with a fastener passing through the fastener hole 108. For instance, where a fastener from a specified fastener class for a washer (e.g., a standard washer without tabs, facets or the like) is used with an equivalently specified gripping washer 100 the gripping tip 304 is positioned by the tab arm 302 to reliably engage with and grip the fastener when passed through the fastener hole 108.

The recess arcs 116 interposed between the facets 114 recess at least part of the elastomeric gripping tabs 112 away from the fastener hole 108 where the fastener passes during coupling and gripping with the gripping washer 100. Recessing of the elastomeric gripping tabs away from the fastener, for instance, through the recess arcs 116 provides space for the elastomeric gripping tabs 112 to deflect within the fastener hole and provide reliable consistent engagement with the fasteners passed therethrough. Additionally, the recess arcs 116 provide ample room for the deformation wells 202 shown in FIG. 3 (as well as the deformation wells 202 formed in the gripping tab support 200 shown in FIG. 2). As previously described in FIG. 2, the deformation wells 202 shown in FIG. 3 provide space for the elastomeric gripping tabs 112 to pliably deform into as the gripping tab is deformed during fastening of a fastener with a work piece. Stated another way, as the gripping washer 100 is sandwiched between the fastener head and the work piece during fastening, the elastomeric gripping tabs 112 are deformed into the fastener hole 108 and received therein by filling in at least part of the deformation wells 202.

Referring again to FIG. 3 in one example, the elastomeric gripping tabs 112 have a consistent pliability throughout the elastomeric gripping tabs 112, for instance, from the base 300 through the tab arm 302 to the gripping tip 304. In another example, the elastomeric gripping tabs 112 have varying pliability therethrough, for instance, the gripping tip 304 constructed with a butyl rubber is treated with, for instance, ultraviolet light, chemicals, heat and the like to have a greater stiffness than the tab arm 302 and base 300 of the elastomeric gripping tab 112. The increased hardness at the gripping tip 304 provides enhanced engagement and grip along the fastener and thereby ensures a more reliable coupling between the gripping washer 100 and a fastener extending through the fastener hole 108. Optionally, the gripping tip 304 is constructed with a different material co-molded with the tab arm 302 and the base 300 of the elastomeric gripping tab 112. For instance, the gripping tip 304 is constructed with material having increased hardness for reliable engagement with the fastener while one or more of the base 300 and the tab arm 302 are constructed with materials having enhanced pliability to ensure deflection of the elastomeric gripping tabs 112 during coupling and gripping with the fastener. Stated another way, the base 300 and the tab arm 302 cooperate to ensure deflection of the elastomeric gripping tabs 112 and reliable biasing of the gripping tip 304 into snug engagement with the fastener. The pliable base 300 and the tab arm 302 thereby ensure the gripping tip 304 (whether having an increased hardness or identical hardness to the remainder of the elastomeric tab) engages in snug and reliable engagement with the fastener for gripping of the fastener by the gripping washer 100.

FIGS. 4A and 4B show the gripping washer 100 shown in FIG. 1A in gripping configurations with a plurality of fasteners 400, 406. Referring first to FIG. 4A, the gripping washer 100 is shown in a gripping configuration with the fastener 400. The fastener 400 includes a fastener head 402 and a shank 404 extending away from the fastener head 402. As shown in FIG. 4A, the shank 404 is unworked or bare. In the example shown in FIG. 4A, a portion of the gripping washer 100 is removed to better illustrate the deformable elastomeric tabs 112. Optionally, the gripping washer 100 has a discontinuous configuration with a gap between opposed ends of the washer body 102 (e.g., a spring washer or locking washer).

FIG. 4A shows the elastomeric gripping tabs 112 engaged along the shank 404. The elastomeric gripping tabs 112 are in a deflected configuration with the tabs deflected along the shank 404 and extending at least partially out of the fastener hole 108. Stated another way, at least a portion of the elastomeric gripping tabs 112 is presented beneath the second rigid support surface 106 of the washer body 102. As previously described, deformation of the elastomeric gripping tabs 112 snuggly engages the tabs along the shank 404 and provides a reliable coupling between the gripping washer 100 and the fastener 400 to substantially ensure the gripping washer 100 remains coupled with the fastener 400 before and during fastening of the fastener 400, for instance, with a work piece or work pieces.

Referring now to FIG. 4B, the gripping washer 100 is shown engaged with a threaded fastener 406. The threaded fastener 406 includes a fastener head 408 and a threaded shank 410 extending from the fastener head 408. As shown in FIG. 4B, the gripping washer 100 is positioned with the elastomeric gripping tabs 112 engaged within an underfill recess 412 beneath the fastener head 408. In one example, the underfill recess 412 is formed during the process of threading the threaded shank 410. Referring to both FIGS. 4A and 4B, it is apparent that the elastomeric gripping tabs 112 of the gripping washer 100 shown in FIG. 4B are deflected to a lesser extent than the same tabs 112 shown in FIG. 4A. For example, the underfill recess 412 of the threaded shank 410 presents a smaller diameter than the bare shank 404 shown in FIG. 4A. The elastomeric gripping tabs 112 of the gripping washer 100 are configured for engagement and gripping with each of the shanks 404, 410. That is to say, the gripping washer 100 (including the elastomeric gripping tabs 112) is sized and shaped to engage with fasteners 400, 406 (as well as other fasteners) having variation in diameters. The elastomeric gripping tabs provide a flexible coupling configured to engage with and retain the gripping washer 100 along a variety of fastener diameters. Stated another way, the elastomeric gripping tabs 112 of the gripping washer 100 are sized and shaped with sufficient flexibility (e.g., length of tabs, pliability of tabs and the like) to grip any fastener no matter what the shank configuration may be including, for instance, bare shanks, unworked shanks, threaded shanks, exposed threads along a shank and the like). As described immediately below, in one example the gripping washer 100, the elastomeric gripping tabs 112 and the inner washer perimeter 110 are configured for gripping any fastener with any shank configuration within a specified fastener class for an equivalently sized standard washer.

As previously described above, the gripping washer 100 is sized and shaped with the inner washer perimeter 110 including the facets 114, recess arcs 116 as well as the elastomeric gripping tabs 112 positioned therein to grip substantially any fastener with any shank configuration (unworked shanks, threaded shanks, underfill recess areas beneath fastener heads and the like). Stated another way the configuration of the fastener holes 108 with the facets 114 and recess arcs 116 (see FIGS. 1A, 1B) provides an effective inner diameter of the inner washer perimeter 110 to the gripping washer that positions the elastomeric gripping tabs 112 positioned along the perimeter to successfully engage and grip a fastener disposed within the fastener hole 108.

In one example, the gripping washer 100 (including a conical gripping washer 120 as well as other gripping washers having different shapes and configurations as previously described) is configured to grip any fastener of a fastener class with one or more of the elastomeric gripping tabs 112. That is to say that gripping washer 100 is sized as an equivalent to a standard washer (a washer without the facets and recess arcs 114, 116 and elastomeric gripping tabs 112). The gripping washer 100 is thereby equivalent to a standard washer with regard to fit and support of fastener heads. The elastomeric gripping tabs 112, the facets 114 and the recess arcs 116 of the inner washer perimeter 110 are sized and shaped to ensure the gripping washer 100 is configured for engagement and gripping along the shafts of any of the fasteners within that fastener class (e.g., fasteners having a diameter appropriate to a standard washer and within the tolerances provided by specified standards). A technician using the gripping washers 100 is thereby able to confidently assemble the gripping washer 100 with any fastener within the fastener class and the gripping washer 100 will reliably and consistently grip around the fastener and thereby provide an assembly of a fastener and a gripping washer 100 and it will retain the gripping washer 100 there along before and during fastening of the fastener with the work piece. Unintended decoupling of the fastener and gripping washer 100 is thereby substantially avoided. Similarly, the decoupling of the gripping washer 100 and subsequent loss of the gripping washer, for instance, within expensive hardware on an assembly floor, within a clean room and the like are substantially prevented.

In another example, a plurality of fasteners and gripping washers 100 are assembled away from an assembly site or manufacturing floor, for instance, by technicians. For instance, a tray or other assembly aid is provided to orient a plurality of fasteners with their shanks exposed. The gripping washers are easily pushed or threaded onto the shanks (either by technicians or through automation) and the consistent orientation of the fasteners with the gripping washers 100 facilitates inspection for quality control and precision cleaning. The assemblies of the gripping washers 100 and fasteners are stored, for instance in the tray, and are easily used by other technicians when use of a fastener and gripping washer 100 assembly is desired. The technicians using the assembly may confidently use the fasteners 400 with the gripping washers 100 without risk of the gripping washers 100 becoming decoupled from the fasteners 400, 406 prior to handling, during handling or during fastening.

FIG. 5 shows one example of a fastener 500 coupling a first work piece 508 with a second work piece 510. As shown in FIG. 5, the fastener 500 includes a fastener head 502 and a shank 504 extending from the fastener head. The shank 504 extends through the first and second work pieces 508, 510 and is coupled at an opposed end to the fastener head 502 with a second fastener element, such as a nut 506. As shown in FIG. 5, a gripping washer 100 is interposed between the fastener head 502 and a work piece surface 512 on the first work piece 508. As shown the gripping washer 100 includes an inner washer perimeter 110 including one or more elastomeric gripping tabs 112 extending from the inner washer perimeter 110 to engage (and thereby grip) the shank 504 of the fastener 500.

As previously shown, for instance in FIGS. 4A and 4B, when the gripping washer 100 is assembled with the fasteners 400, 406 some amount of deformation is experienced by the elastomeric gripping tabs 112. For instance, as shown in FIG. 4A the elastomeric gripping tabs 112 extend outside of the fastener hole 108 and in one example extend below the second rigid support surface 106 of the gripping washer 100. Because the elastomeric gripping tabs 112 are pliable (e.g., constructed with a pliable material such as butyl rubber) the elastomeric gripping tabs 112 deflect with engagement between the fastener head 502 and the work piece 512 as shown in FIG. 5. That is to say, the elastomeric gripping tabs 112 deform from a configuration shown in FIG. 4A to the configuration shown in FIG. 5 where the elastomeric gripping tabs 112 are substantially positioned within the fastener hole 108.

Referring to FIGS. 2 and 3, for instance, the gripping washer 100 is provided with deformation wells 202 (as part of the gripping tab support 200 or formed between the inner washer perimeter 110 and the gripping tabs 112) sized and shaped to receive the deformed elastomeric gripping tabs 112 during sandwiching engagement of the gripping washer 100 between the fastener head 502 and the first work piece 508. By providing the deformation wells 202, for instance within the recess arcs 116 of the fastener hole 108 the elastomeric gripping tabs 112 are deformed and fill at least portions of the deformation wells 202 to ensure the elastomeric gripping tabs 112 are a) fully moved out of interposing engagement between the gripping washer 100 and the work piece surface 512 as shown in FIG. 5, and b) are not packed or axially compressed within fastener hole 108 so tightly as to radially compress or choke the fastener shank 504. By filling the deformation wells 202 during fastening of the fastener 500 with the first and second work pieces 508, 510 the gripping washer 100 is able to substantially eliminate any counter forces such as counter torques otherwise generated if the tabs were either interposed between the first work piece 508 and the gripping washer 100 or compressed with fastener hole 108 so as to choke the fastener shank 504. Stated another way, the gripping washer 100 is configured to ensure the washer remains reliably fastened with the fastener 500 before and during fastening of the fastener with the first and second work pieces 508, 510. At the same time the gripping washer 100 ensures that the elastomeric gripping tabs 112 are positioned away from the mating surfaces of the gripping washer 100, the fastener head 502 and the work piece surface 512 during fastening to ensure that the gripping washer 110 does not alter the torque necessary to fasten the fastener 500 with the first and second work pieces 508, 510. That is to say, during fastening the gripping washer 100 behaves, as far as operator effort is concerned, in substantially the same manner as a standard washer without the elastomeric gripping tabs 112. A technician thereby applies the same amount of torque to the fastener 500 with the gripping washer 100 provided as the technician would apply with a standard washer otherwise assembled between the work piece surface 512 and the fastener head 502.

FIG. 6A shows one example of the gripping washer 100 in a top view. As shown the gripping washer 100 includes a washer body 102 and a fastener hole 108 circumscribed by the inner washer perimeter 110. As previously described, the inner washer perimeter 110 includes a plurality of facets 114 and recess arcs 116. The plurality of elastomeric gripping tabs 112 are positioned in each of the recess arcs and extend into the fastener hole 108. The elastomeric gripping tabs 112 are sized and shaped for snug engagement with fasteners extending through the fastener hole 108.

As shown in FIG. 6A, the gripping washer 100 includes an effective diameter such as a centering diameter 600 extending across the fastener hole 108. As shown the centering diameter 600 draws an equivalent circle within the fastener hole 108 shown by taking the diameter 600 and rotating it about a center access 601 (e.g., longitudinal axis) of the gripping washer 100. In one example, the centering diameter 600 is chosen for the gripping washer 100 according to a lower range of effective inner diameter of an equivalent standard washer to ensure the gripping washer 100 always supports a fastener head and grips a shank such as shanks 404, 410 shown in FIGS. 4A and 4B. Additionally, in another example, the centering diameter 600 is chosen for the gripping washer 100 to ensure that the gripping washer 100, for instance, first rigid support surface 104 engages the entire perimeter of a fastener head disposed over the gripping washer 100. For instance, a standard washer typically has a specified inner diameter with some amount of tolerance (e.g., plus or minus 0.010 inches from a specified diameter). The centering diameter 600 is provided at the bottom of this range such as at the specified diameter in the lower end of the tolerance range to ensure that the inner washer perimeter 110 is positioned beneath the fastener head when the gripping washer 100 is coupled with the fastener. Stated another way, by choosing the lower end of specified diameter for a standard washer and ensuring the centering diameter 600 has a corresponding diameter, the gripping washer 100 is configured to reliably and consistently support the entire perimeter of the fastener head where the fastener is disposed within the fastener hole 108.

Figure 6B:
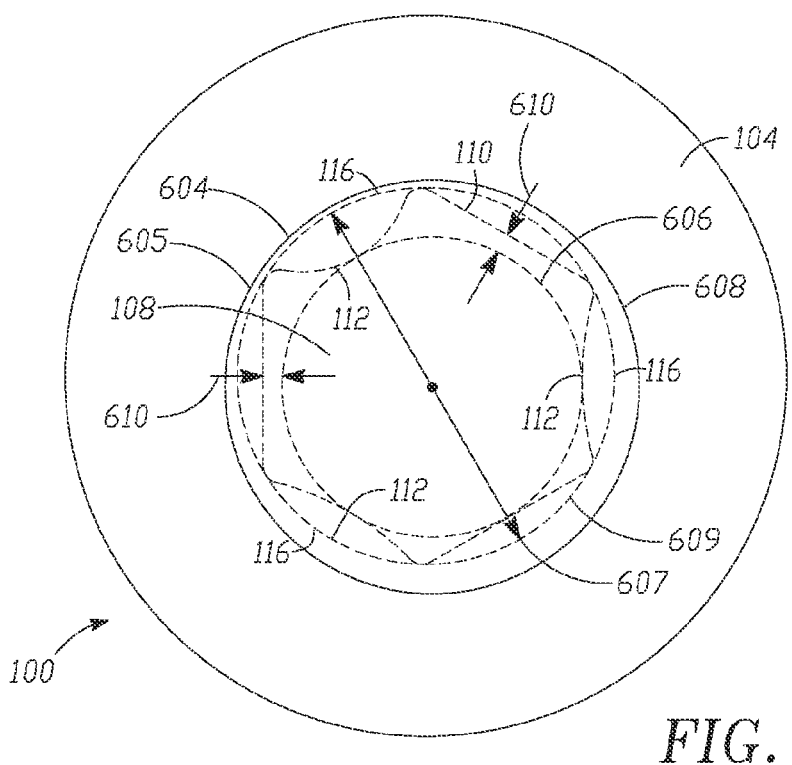
FIG. 6B is a top view of the gripping washer of FIG. 6A with a fastener positioned within a fastener hole and continuously supported around the circumference of the fastener head by the gripping washer.

Referring to FIGS. 6A & 6B, the gripping washer 100 includes an effective diameter, such as a circular equivalent diameter 607 encompassing the full extent of the fastener hole 108. As shown the circular equivalent diameter 607 draws an equivalent circle 609 about the fastener hole 108 and the recess arcs 116 are tangent to the equivalent circle 609. The recess arcs 116 are positioned and sized as perimeter surfaces of the fastener hole 108 such that the perimeter of the equivalent circle 609 is sufficiently smaller than the fastener head perimeter 608 to thereby ensure the fastener hole 108 is fully covered in the installed condition.

Further, while the inner washer perimeter 110 is configured to fully support the perimeter of a fastener head, the recess arcs 116 are sized and shaped to recess away from the centering diameter 600 and provide space for the elastomeric gripping tabs 112 to engage with and grip the shank of the fastener. Stated another way the elastomeric gripping tabs 112 are interposed between the inner washer perimeter and the shank when the shank is positioned within the fastener hole 108. The gripping washer 100 is thereby able to fully support the entire fastener head while at the same time provide sufficient space for the elastomeric gripping tabs 112 to interpose, deflect and engage (e.g., grip) with a fastener disposed within the fastener hole.

The facets 114 within the fastener hole 108 define a portion of the inner washer perimeter 110 and form the outer edges of the circle drawn according to the centering diameter 600 as shown in FIG. 6A. As will be described in further detail below, the facets 114 provide a centering function for fasteners passed through the fastener hole 108. As shown in FIG. 6A, as a fastener is passed through the fastener hole 108, the facets 114 cooperate with one another to selectively engage the surfaces of the fastener and guide the fastener towards the longitudinal axis 601 of the gripping washer 100. The centering effect of the facets 114 ensures the fastener head is robustly supported along its entire perimeter and spaced away from the recess arcs 116 shown in FIG. 6A.

The elastomeric gripping tabs 112 shown in FIG. 6A, are in one example, sized and shaped so that the gripping tips 304 extend to at least a minimum shank diameter of fasteners within a specified fastener class for an equivalent standard washer. Stated another way, the elastomeric gripping tabs 112 are sized and shaped to extend into the fastener hole 108 a sufficient distance to engage and deflect along and thereby grip all fasteners within a specified fastener class passed through the fastener hole 108 of the gripping washer 100. The gripping washer 100 is thereby able to receive all fasteners within a specified fastener class for the equivalent standard washer and grip each of those fasteners within the fastener hole 108 with the elastomeric gripping tabs 112. At the same time the gripping washer 100 fully supports the fastener heads of all fasteners within the fastener class with the first rigid support surface 104 extending around the inner washer perimeter 110.

Optionally, the gripping washer 100 includes one or more fillets 602 interposed between the facets 114 and the recess arcs 116. The fillets 602 provide a curved transition that eliminates any sharp joints between the facets 114 and the arcs 116. Stress concentrations at the transitions between the facets 114 and the recess arcs 116 are thereby substantially avoided.

Referring now to FIG. 6B, one example of a fastener 604 including a fastener head 605 is shown positioned within the fastener hole of a gripping washer 100. As shown in broken lines in FIG. 6B, the fastener 604 includes a shank 606 positioned within the fastener hole 108. As previously described, the inner washer perimeter 110 extends around the fastener hole 108 and is sized and shaped to provide recess arcs 116 for the elastomeric gripping tabs 112 (shown in FIG. 6A) while at the same time being configured to receive the shank 606 therein and robustly support the fastener head 605 along an entire fastener head perimeter 608. FIG. 6B shows the robust support provided to the fastener head perimeter 608 by the first rigid support surface 104 of the gripping washer 100 extending continuously around and under the fastener head 605. The centering diameter 600 shown in FIG. 6A ensures that the facets 114 cooperate to position the shank 606 near the longitudinal axis 601 of the gripping washer 100. The fastener head 605 is thereby correspondingly positioned by the facets 114 to ensure the fastener head 605 is continuously supported around the facet head perimeter 608. Further, the facets 114 position the shank 606 within the fastener hole 108 to bias the shank 606 toward each of the one or more elastomeric tabs 112. By centering the shank 606 through the facets 114 (according to the centering diameter 600) the elastomeric gripping tabs 112 are each able to deflect around the shank 606 and grip the shank 606. Any gaps between the elastomeric gripping tabs 112 and the shank 606 are substantially prevented.

Further, as shown in FIG. 6B, even with a fastener gap (as shown by the gaps 610 provided in FIG. 6B) between the shank 606 and the inner washer perimeter 110 the facets 114 along the centering diameter 600 of the inner washer perimeter 110 ensure that the shank 606 is substantially centrally located near the longitudinal axis 601 of the gripping washer 100. By positioning the shank 606 near the longitudinal axis 601 robust support is provided to the entire fastener head perimeter 608 even with the gaps 610. As shown in FIG. 6B, portions of the first rigid support surface 104 of the gripping washer 100 are provided beneath the entire perimeter of the fastener head 605. Compressive forces from the fastener head 605, for instance, during a fastening operation are thereby near equally distributed around the gripping washer 100 and there are no edges of the fastener head 605 disposed within or above the fastener hole 108.

FIG. 7A through 7C show one example of a fastener 700 in the process of being coupled with and gripped by the gripping washer 100 shown in FIG. 1A. As shown in FIG. 7A, the gripping washer 100 includes elastomeric gripping tabs 112 in an undeflected state prior to engagement with the fastener 700 including the shank 704 or threads 706 of the fastener 700. FIG. 7B shows the gripping washer 100 in an intermediate configuration with the gripping washer 100 positioned along the shank 704 and the elastomeric gripping tabs 112 deflected and engaged along the shank 704 to provide a grip between the gripping washer 100 and the fastener 700. As shown the elastomeric gripping tabs 112 are deflected outside the fastener hole 108 of the gripping washer 100. Stated another way, the elastomeric gripping tabs 112 extend beyond the second rigid support surface 106 of the gripping washer 100. FIG. 7C shows the gripping washer 100 in a gripping configuration where the gripping washer 100 is positioned beneath the fastener head 702 and the elastomeric gripping tabs 112 are deflected and engaged with the shank 704 to grip and retain the gripping washer 100 along the fastener 700.

FIG. 8 shows a detailed view of the fastener head 702 and the shank 704 after positioning of the gripping washer 100 as shown in FIG. 7C. As shown, the elastomeric gripping tabs 112 are deflected and engaged along the shank 704 to grip the gripping washer 100 to the fastener 700. The elastomeric gripping tabs 112 extend beyond the second rigid support surface 106 in this example and thereby also extend outside of the fastener hole 108. As previously described and shown in FIG. 5, in one example, the fastening of the fastener 700, for instance with work pieces, deforms the elastomeric gripping tabs 112 and forces the elastomeric gripping tabs into deformation wells within the inner washer perimeter 110 to substantially ensure the torque required to fasten the fastener 700 with the work pieces remains substantially similar to the torque required with a standard washer and fastener combination.

As shown in FIGS. 7A through 7C, the gripping washer 100 is installed after formation of the fastener 700. For instance, the fastener during formation is worked to include fastening features, such as the threading 706. The gripping washer 100 is installed after the formation process and includes the elastomeric gripping tabs 112 to deflect and grip along the shank 704. Deformation of the fasteners 700, for instance through forming of fastening features, such as the threading 706, is not necessary to engage the fastener 700 with a washer. Stated another way, the gripping washer 100 provides the gripping function between the fastener 700 and the washer 100 after the fastener 700 is fully formed. The gripping washer 100 engages the fully formed fastener 700 with the deflected elastomeric gripping tabs 112 as shown in FIGS. 7B and 7C without relying on deformation of the fastener (e.g., through forming of threading and the like) to engage the fastener with the washer.

By relying on the elastomeric gripping tabs 112 to provide the gripping engagement between the gripping washer 100 and the fastener 700 assembly of the gripping washer and the fastener 700 may occur on site and outside of a clean room as opposed to on a factory floor during formation of the fastening features for the fastener 700. By assembling the fastener 700 and the gripping washer 100 after formation of the fastener, parts catalogues and quality pedigrees remain substantially unchanged without the need for additions or supplements to account for many permutations of fasteners, washers, and fastener and washer combinations. That is to say, instead of having separate catalog numbers and pedigrees for a fastener, a washer and fastener and washer combinations, the washer such as the gripping washer 100 is simply catalogued by itself with its own pedigree and then used with an existing fastener (or fasteners) having its own preexisting catalog number and quality pedigree. The capability of assembling the gripping washer 100 with the fastener 700 thereby facilitates the maintenance of existing quality control and pedigree practices without requiring changes for the addition of preassembled fastener and washer combinations.

Figure 9B:
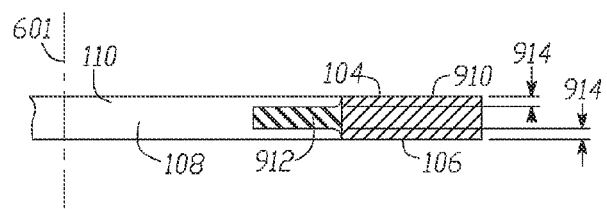
FIG. 9B is a detailed partial cross sectional view of a portion of another gripping washer with an elastomeric gripping tab positioned within the fastener hole and remote from the washer support surfaces.

FIGS. 9A and 9B show respective gripping washers 900, 910 with elastomeric gripping tabs 902, 912 positioned at various locations within the fastener hole 108. Referring first to FIG. 9A, the gripping washer 900 is presented with elastomeric gripping tabs 902 positioned adjacent to a second rigid support surface 106 of the gripping washer 900. Correspondingly, the elastomeric gripping tab 902 is positioned away from the first rigid support surface 104 of the gripping washer 900. As shown in FIG. 9A, the elastomeric gripping tab 902 is spaced from the first rigid support surface 104 by a gap 904.

Referring now to FIG. 9B, another example of an elastomeric gripping tab 912 is shown positioned along the inner washer perimeter 110 of the gripping washer 910. As shown the gripping washer 910 is positioned remotely from the first and second rigid support surfaces 104, 106. For instance, the elastomeric gripping tab 912 is spaced from the first and second rigid support surfaces 104, 106 by gaps 914. As shown in FIG. 9B, the elastomeric gripping tab 912 is positioned equidistantly between the first and second support surfaces 104, 106. In another example, the elastomeric gripping tab 912 positioned within the fastener hole 108 is positioned near to but not adjacent one of the first and second rigid support surfaces 104, 106. For example, the elastomeric gripping tab 912 is positioned with a smaller gap between the tab and the second rigid support group surface 106 relative to the space or gap 914 between the first rigid support surface 104 and the tab 912.

As will be described in further detail below, the elastomeric gripping tabs 902, 912 have tap thicknesses less than the thickness of the gripping washers 900, 910. By providing the elastomeric gripping tabs 902, 912 with thicknesses less than that of the washers 900, 910 the tabs are readily received within the inner washer perimeter 910 including the deformation wells 202 shown in FIGS. 2 and 3 when deformed (e.g., during fastening of a fastener coupled with the gripping washers 900, 910). As discussed above, deformation of the elastomeric gripping tabs 902, 912 into the fastener holes 108 including for instance the deformation wells 202 ensures the elastomeric gripping tabs 902, 912 do not interfere with torquing of the fastener and thereby facilitates torquing of fasteners into work pieces comparable to that provided with standard washers and fasteners.

Providing one or more elastomeric gripping tabs 902, 912 away from one or more of the first and second support surfaces 104, 106 ensures the elastomeric gripping tabs are at least partially isolated from abrading forces caused by interaction with fastening features on a fastener, for instance, threading and the like. Stated another way, the facets 114 of the gripping washers center the fasteners including the fastening features such as threading and thereby move the fastening features away from tight abrading engagement with the elastomeric gripping tabs 902, 912. The elastomeric gripping tabs 112 are thereby protected during passage of the fastener therethrough. The facets 114 in effect protect the elastomeric gripping tabs 902, 912 during passage of the threaded fastener from abrasion and thereby ensure the elastomeric gripping tabs 902, 912 are present and retain their structural integrity for gripping the fastener.

Figure 10A:
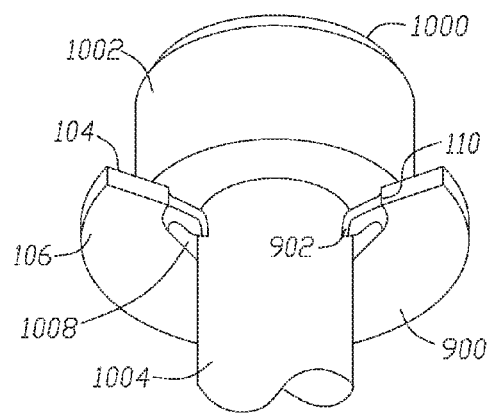
FIG. 10A is a partial sectional view of the gripping washer of FIG. 9A in a gripping configuration with the elastomeric gripping tabs positioned adjacent to a second washer support surface opposed to a fastener head.
Figure 10B:
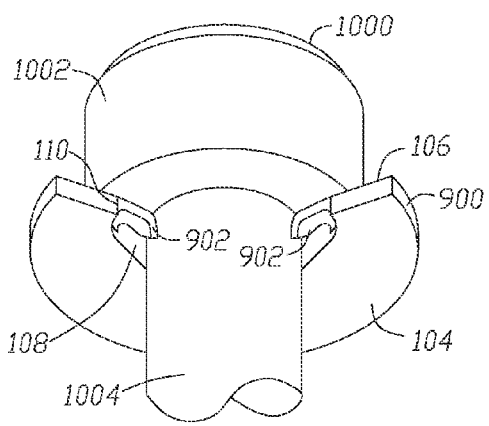
FIG. 10B is a partial sectional view of the gripping washer of FIG. 9A in a gripping configuration with the elastomeric gripping tabs positioned adjacent to a first washer support surface adjacent to a fastener head.
Figure 10C:
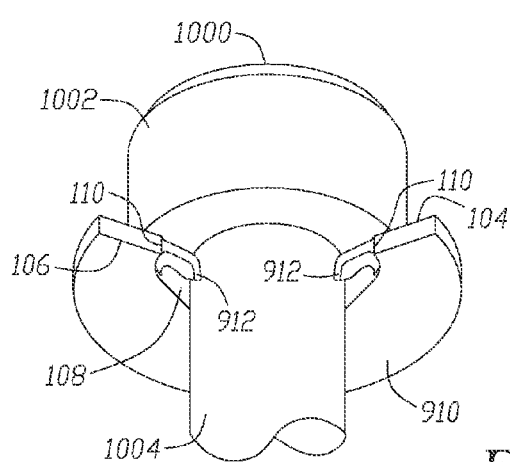
FIG. 10C is a partial sectional view of the gripping washer of FIG. 9B in a gripping configuration with the elastomeric gripping tabs positioned remote from the first and second washer support surfaces.

FIGS. 10A through 10C, show the gripping washers 900, 910 coupled with an exemplary fastener 1000. The elastomeric gripping tabs 902, 912 are shown in deflected and engaging orientations relative to the fasteners 1000 and provide gripping engagement between the gripping washers 900, 910 and the fastener 1000. Referring first to FIG. 10A, the gripping washer 900 shown in FIG. 9A is provided with the first rigid support surface 104 positioned beneath the fastener head 1002 and the second rigid support surface 106 faces along the shank 1004. As shown the elastomeric gripping tabs 902, are positioned along the inner washer perimeter 108 and extend out of the fastener hole 108 past the second rigid support surface 106 through deformation caused by engagement with the shank 1004 of the fastener 1000.

As previously described and shown, for instance in FIGS. 6A and 6B, the facets 114 of the inner washer perimeter 110 physically engage the fastener 1000 during passage of the fastener through the fastener hole 108. In one example, the facets 114 provide a centering or positioning effect for the fastener 1000 and assist in positioning the fastener shank 1004 centrally within the fastener hole 108. As shown in FIG. 10A, the elastomeric gripping tabs 902 are positioned remotely relative to the first rigid support surface 104 and the fastener head 1002. With the elastomeric gripping tabs 902 positioned in such a manner passage of the shank 1005 through the fastener hole 108 allows the shank 1004 to initially engage with the facets 114 and allows the facets 114 to guide the shank 1004 toward the center of the fastener hole 108. By guiding the fastener shank 1004 toward the center of the fastener hole 108 the elastomeric gripping tabs 902 are at least partially isolated from tight abraiding contact with the fastening features along the shank 1004, such as threading. Instead initial contact is made with the facets 114 (see FIG. 6A), thereby at least partially insulating the elastomeric gripping tabs 902 from this engagement. The elastomeric gripping tabs 902 positioned within the recess arcs 116 (see FIG. 1A) deform with passage of the shank 1004 therethrough and grip the shank as shown in FIG. 10A. Stated another way, the facets 114 of the inner washer perimeter 110 protect the deformable elastomeric gripping tabs 902 from abrading engagement and thereby maintain the structural integrity of the tabs 112 for engagement, deflection and gripping of the gripping washer 900 with the fastener 1000.

FIG. 10B shows another example of the gripping washer 900 shown in FIG. 9A coupled with the fastener 1000. As shown in FIG. 10B, the gripping washer 900 is in an inverted orientation (relative to FIG. 10A) where the elastomeric gripping tabs 902 are positioned adjacent to the second rigid support surface 106 and the second rigid support surface and the elastomeric gripping tabs 902 are positioned immediately underneath the fastener head 1002. As shown, the elastomeric gripping tabs 902 are deflected through engagement with the shank 1004 and provide gripping engagement between the gripping washer 900 and the fastener 1000.

In contrast to the orientation shown in FIG. 10A, the elastomeric gripping tabs 902 are presented adjacent to the leading surface that initially engage with the shank 1004 during passage of the shank 1004 through the fastener hole 108. In this configuration, the facets 114 continue to center the shank 1004 within the fastener hole 108 while the elastomeric gripping tabs 112 immediately engage with the shank 1004 including fastening features such as threading to grip and retain the gripping washer 900 on the shank 1004. Referring back to FIG. 6A, with the elastomeric gripping tabs 902 positioned near the fastener head 1002, the tabs initially engage the fastening features of the shank 1004 along with the facets 114. The elastomeric gripping tabs (112 shown in FIG. 6A) are positioned within recess arcs 116 and are thereby substantially recessed from the shank 1004. The recess arcs protect the tabs from tight abrading contact with fastening features along the shank 1004.

In both of the orientations shown in FIGS. 10A and 10B, the elastomeric gripping tabs 902 are deflected when engaged along the fastener 1000. In the case of FIG. 10B with the elastomeric gripping tabs 902 adjacent to the second rigid support surface 106 the elastomeric gripping tabs 902 extend out of the fastener hole 108 to a smaller degree (or not at all) relative to the gripping tabs 902 shown in FIG. 10A. By presenting the elastomeric gripping tabs 902 to a smaller degree relative to those shown in FIG. 10A the elastomeric gripping tabs 902 have a substantially negligible effect on torqueing of the fastener 1000 relative to a work piece. In the example shown in FIG. 10A, where the elastomeric gripping tabs 902 are more fully presented outside of the fastener hole 108 and removed from the fastener head 1002 because of the positioning adjacent to the second rigid support surface 106 the pliable nature of the elastomeric gripping tabs 902 facilitates their ready deformation into the fastener hole 108 during engagement and fastening with the work piece.

FIG. 10C shows the gripping washer 910 from FIG. 9B positioned around and gripping the fastener 1000 about the fastener shank 1004. As previously described, the elastomeric gripping tabs 912 are positioned remotely from the first and second rigid support surfaces 104, 106. As shown in FIG. 10C, the elastomeric gripping tabs 912 are deflected relative to the orientation shown in FIG. 9B and grip the gripping washer 900 along the shank 1004. The gripping washer 910 is thereby retained along the shank 1004 of the fastener 1000. By positioning the elastomeric gripping tab 912 between the first and second rigid support surfaces 104, 106 the elastomeric gripping tabs 912 in a deflected orientation extend at least partially out of the fastener hole 108 when gripping the fastener shank 1004. As previously described, the gripping washer 100 includes deformation wells and recess arcs 202, 116, respectively. The wells and recess arcs 202, 116 are sized and shaped to receive the elastomeric gripping tabs 912 during deformation, for instance, through fastening of the fastener 1000 with a work piece. By positioning the elastomeric gripping tabs 912 having a thickness less than the gripping washer 910 intermediately between the first and second rigid support surfaces 104, 106 the elastomeric gripping tabs 912 are readily received within the inner washer perimeter 110 during fastening. The elastomeric gripping tabs 912 are thereby positioned within the fastener hole 108 and provide substantially no counter torque to fastening (rotation) of the fastener 1000. The elastomeric gripping tabs 912 behave in much the same manner as the elastomeric gripping tabs 902 in the configuration shown in FIG. 10B.

Further, because the elastomeric gripping tabs 912 are positioned away from the first rigid support surface 104 the elastomeric gripping tabs 912 are isolated in a similar manner to the gripping tabs 902 shown in FIG. 9A from tight abrading engagement with threading features such as threads along the shank 1004. Stated another way, the intermediate positioning of the elastomeric gripping tabs 912 between the first and second support surfaces 104, 106 facilitates easy deformation and reception into the fastener hole 108 and at the same time ensures that surfaces along the first rigid support surface 104, such as the facets 114 shown in FIGS. 1A and 6A, initially engage with the shank 1004 and center the shank 1004 within the fastener hole 108 prior to tight abrading engagement with the elastomeric gripping tabs 912.

Figure 11:
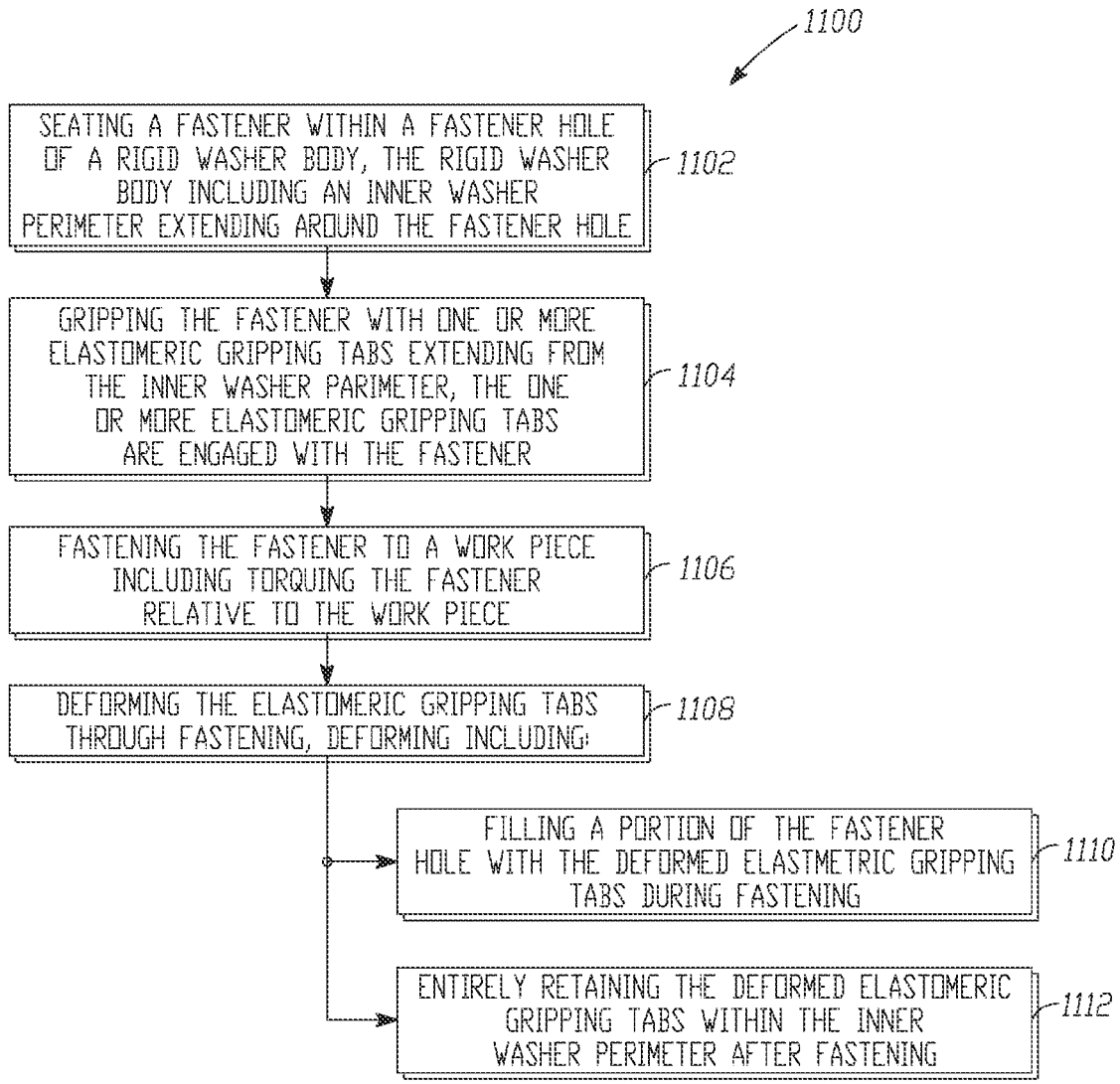
FIG. 11 is a block diagram showing one example of a method for using a gripping washer.

FIG. 11 shows one example of a method 1100 in a block diagram format. Method 1100 provides one example of a method of using a gripping washer, such as the gripping washer 100 shown in FIG. 1A. Reference is made in the description of the method 1100 to various features, elements and the like previously described herein. Reference to any particular elements or features are not intended to be limiting but instead are exemplary, and any reference to an element or feature is intended to include all similar elements and features within the specification and equivalents.

The method 1100 includes at 1102 seating a fastener such as a bolt, screw and the like within a fastener hole 108 of a rigid washer body 102 of a gripping washer 100. The rigid washer body 102 includes an inner washer perimeter 110 extending around the fastener hole 108. At 1104, the method 1100 includes gripping the fastener with one or more elastomeric gripping tabs 112 extending from the inner washer perimeter 110. For instance, the elastomeric gripping tabs deflect when engaged with the fastener and grip the fastener shank. The one or more elastomeric gripping tabs 112 are engaged with the fastener, for instance, along the fastener shank including but not limited to a bare shank, a threaded shank or an under fill area provided below a fastener head. As previously described herein, the gripping washer 100 with the elastomeric gripping tabs 112 is configured to engage and grip along any shank configuration and shank diameter within a specified fastener class equivalent to a stated washer corresponding to the size of the gripping washer 100. In still another example, gripping the fastener with one or more elastomeric gripping tabs 112 includes deflecting the one or more elastomeric gripping tabs 112 outside the fastener hole.

At 1106, the method 1100 includes fastening of the fastener to a work piece including torquing the fastener relative to the work piece. The gripping washer 100 as previously described is positioned along the fastener shank and thereby interposed between the fastener head and the work piece during torquing. As previously described, the operation of fastening the fastener to a work piece involves the application of torque to the fastener to rotate it and provide a reliable coupling with the work piece, for instance, for coupling two work pieces together. The gripping washer 100 as previously described is sized and shaped with the elastomeric gripping tabs 112 to ensure substantially no counter torque is applied to the fastening operation and the torque used to rotate a fastener using a gripping washer such as gripping washer 100 is substantially equivalent to the torque used when using the fastener with a standard washer without the elastomeric gripping tabs 112.

At 1108, the elastomeric gripping tabs 112 are deformed during fastening to fill a portion of the fastener hole 108 with the deformed elastomeric gripping tabs 112 as shown at 1110. In one example, the gripping washer 100 includes deformation wells 202 (see FIGS. 2 and 3). As the fastener is torqued relative to the work pieces the deformed elastomeric gripping tabs 112 are deflected inwardly into the fastener hole 108 through engagement with the work piece. The deformation wells 202 facilitate the reception of the elastomeric gripping tabs 112 within the inner washer perimeter 110. Correspondingly, at 1112 the method 1100 includes retaining the deformed elastomeric gripping tabs 112 entirely within the inner washer perimeter 110 after fastening. As previously described, the engagement between the fastener head and the gripping washer and the gripping washer and the work piece gradually deforms the elastomeric gripping tabs 112 previously deflected in some examples partially outside of the fastener hole 108 to grip the shank. The engagement of the fastener head and the work piece with the gripping washer 100 deflects the elastomeric gripping tabs 112 inwardly within the fastener hole 108 of the gripping washer 100. Because in one example, the gripping washer 100 includes deformation wells 202 (formed in the recess arcs 116) when the elastomeric gripping tabs 112 are inwardly deformed they are received within the deformation wells 202 and thereby minimally engage the work piece and apply substantially no counter-torque between the washer, fastener and work piece assembly during fastening.

Several options for the method 1100 follow. In one example, gripping the fastener includes gripping any one fastener of a fastener class with the one or more elastomeric gripping tabs 112. The one or more elastomeric tabs 112 and the inner washer perimeter 110 are configured to grip any fastener of the fastener class prior to fastening of the fastener with a work piece or work pieces. Stated another way the gripping washer 100 including, for instance, the elastomeric gripping tabs 112 and the inner washer perimeter 110 having the facets 114 therein is sized and shaped to provide an effective inner diameter capable of receiving and gripping any fastener specified for use with a standard washer having an equivalent size to the gripping washer 100. Any fastener within the specified class is thereby capable of reception within the fastener hole 108 and the elastomeric gripping tabs 112 are correspondingly sized to engage and grip any of those fasteners.

In another example, the method 1100 includes engaging first and second rigid support surfaces 104, 106 of the rigid washer body 102 in surface to surface contact with one of a fastener head and a work piece surface while the deformed elastomeric gripping tabs 112 are entirely retained within the inner washer perimeter 110. That is to say, because the elastomeric gripping tabs 112 are fully received within the fastener hole 108 during torquing of the fastener relative to the work pieces the elastomeric gripping tabs are not otherwise interposed between any one of the gripping washer 100 and the fastener head or work pieces. The rigid support surfaces 104, 106 thereby provide a consistent and robust mechanical support between the fastener head and the work pieces to reliably transmit and distribute forces therebetween.

In another example, seating the fastener includes centering the fastener through the fastener hole 108 of the gripping washer 100 through engagement with two or more facets 114. The inner washer perimeter 110 includes the one or more facets 114. As shown in previous examples described herein, in one example, the gripping washer 100 includes a plurality of facets 114 interposed between recess arcs 116. The facets 114 provide a centering diameter configured to engage with the fastener as it is passed through the facet hole 108 and thereby position the fastener shaft near to (e.g., coincident with) the washer longitudinal axis. By centering the fastener within the fastener hole 108 the gripping washer 100 underlies the entire perimeter of the fastener head and supports the full perimeter with the rigid washer body 102. Stated another way, the inner washer perimeter 110 including the two or more facets 114 underlies the fastener head and thereby supports the entire fastener head perimeter with the rigid body 102. Optionally, the method 1100 includes supporting any one fastener head of a fastener within a fastener class with a rigid washer body 102. Further, the inner washer perimeter 110 including two or more facets 114 is configured to support the entire perimeter of a fastener head of any of the fasteners within the specified fastener class for an equivalent standard washer corresponding to the gripping washer 100.

In still another option, gripping of the fastener with the elastomeric gripping tabs 112 is performed after centering of the fastener in one example. The two or more facets 114 are adjacent to a first rigid support surface 104 of the rigid washer body 102. The one or more elastomeric gripping tabs 102 are positioned between the first and second rigid support surfaces 104, 106 and at a position opposed to the first rigid support surface. As previously described and shown, for instance in FIGS. 10A and 10C, the elastomeric gripping tabs 912 are positioned away from the first rigid support surface 104 to ensure the fastener, for instance, the shank is engaged by the facets 114 (See FIG. 1A) during passage through the fastener hole 108 while the elastomeric gripping tabs 912 engage with and grip the fastener shank only after the initial centering operation by the facets 114. The elastomeric gripping tabs 112 are thereby protected from tight abrading engagement with threading on the fastener because the facets 114 make initial contact and center the fastener within the fastener hole 108.

CONCLUSION

The gripping washers described herein provide rigid washers with pliable features configured to grip fasteners. The gripping washers provide a plurality of elastomeric gripping tabs sized and shaped to engage with shanks of all fasteners within a specified fastener class corresponding to a standard washer of equivalent size to the gripping washer. The elastomeric gripping tabs facilitate the gripping of the washer with the fasteners without deforming or altering the rigid structure of the washer. The gripping washer thereby maintains the supporting properties (load bearing) of a standard washer while engaged between fastener heads and work pieces and the like.

Because the gripping washer uses elastomeric gripping tabs the gripping washer may be assembled with a fastener after construction of the fastener is complete, for example after the formation of threading and the like. In practice, a technician assembles the finished fasteners with the washers on site outside of a clean room and without requiring new catalog numbers, quality pedigrees and the like needed for following component and component assemblies within a tight quality controlled manufacturing and assembly environment. Stated another way, new catalog numbers and pedigrees for preassembled fastener and washer assemblies are not needed as the gripping washer and fastener may be assembled on site and immediately prior to assembly within a hardware device or stored on the shelf until needed.

Further, the gripping washers described herein including facets and other similar features along the inner washer perimeter ensure a fastener positioned within the fastener hole is positioned toward the center of the gripping washer (e.g., the longitudinal access of the gripping washer). The facets cooperate with the recess arcs of the inner washer perimeter to ensure that the fastener head perimeter is positioned for full support around the entire fastener head perimeter. Stress risers in one or more of the fastener or the washer (e.g., through cantilevering of a portion of the fastener head over the fastener hole without support) are thereby substantially avoided. Further, with the complete support of the entire fastener head perimeter the gripping washer is configured to distribute and transmit tensile forces from the fastener head along the rigid support surfaces engaged with work pieces in the same manner as a standard washer without the elastomeric gripping tabs and centering facets.

During use the elastomeric gripping tabs and the gripping washer provide gripping engagement between the washer and the fastener as previously described. Further, the elastomeric gripping tabs are configured to deform inwardly into the inner washer perimeter during fastening. For instance, the inner washer perimeter includes one or more deformation wells adjacent to the elastomeric gripping tabs that are sized and shaped to receive the elastomeric gripping tabs as the tabs deform through engagement between the gripping washer and a work piece the gripping washer is engaged against. Engagement of the tabs with the work piece that would otherwise noticeably increase the torque needed to turn the fastener is substantially avoided. The assembly of a fastener and a gripping washer is thereby able to fasten work pieces with substantially the same torque as a fastener used in combination with a standard washer. A technician assembling a hardware device with the fastener including the gripping washer applies substantially identical torque to the fastener relative to a standard washer where the gripping washer is used with the elastomeric gripping tabs. Moreover, during fastening the elastomeric gripping tabs are deflected inwardly into the inner washer perimeter of the fastener hole and are received within the fastener hole to substantially prevent the interposing of the elastomeric gripping tabs between the gripping washer and one or more of the fastener heads and the work piece underlying the gripping washer. Direct surface to surface contact and the robust support provided by a washer between the fastener head and the work piece surfaces is thereby achieved through deformation of the elastomeric gripping tabs and filling of the fastener hole with the deformed gripping tabs.

In the foregoing description, the subject matter has been described with reference to specific exemplary examples. However, it will be appreciated that various modifications and changes may be made without departing from the scope of the present subject matter as set forth herein. The description and figures are to be regarded in an illustrative manner, rather than a restrictive one and all such modifications are intended to be included within the scope of the present subject matter. Accordingly, the scope of the subject matter should be determined by the generic examples described herein and their legal equivalents rather than by merely the specific examples described above. For example, the steps recited in any method or process example may be executed in any order and are not limited to the explicit order presented in the specific examples. Additionally, the components and/or elements recited in any apparatus example may be assembled or otherwise operationally configured in a variety of permutations to produce substantially the same result as the present subject matter and are accordingly not limited to the specific configuration recited in the specific examples.

Benefits, other advantages and solutions to problems have been described above with regard to particular examples; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present subject matter, in addition to those not specifically recited, may be varied or otherwise particularly adapted to specific environments, manufacturing specifications, design parameters or other operating requirements without departing from the general principles of the same.

The present subject matter has been described above with reference to examples. However, changes and modifications may be made to the examples without departing from the scope of the present subject matter. These and other changes or modifications are intended to be included within the scope of the present subject matter, as expressed in the following claims.

It is to be understood that the above description is intended to be illustrative, and not restrictive. Many other examples will be apparent to those of skill in the art upon reading and understanding the above description. It should be noted that examples discussed in different portions of the description or referred to in different drawings can be combined to form additional examples of the present application. The scope of the subject matter should, therefore, be determined with reference to the appended claims, along with the full scope of equivalents to which such claims are entitled.

What is claimed is:

1. A gripping washer comprising:
   a washer body constructed with a first material, the washer body includes:
      first and second rigid support surfaces, and
      a fastener hole extending between the first and second rigid support surfaces, an inner washer perimeter extending around the fastener hole; and one or more elastomeric gripping tabs coupled with the inner washer perimeter, the one or more elastomeric gripping tabs extend inwardly into the fastener hole from the inner washer perimeter, the one or more elastomeric gripping tabs constructed with a second material that is pliable relative to the first material of the washer body.

2. The gripping washer of claim 1, wherein the one or more elastomeric gripping tabs each include:
   a deformable arm coupled with the inner washer perimeter, and
   a gripping tip at an end of the deformable arm and spaced inward from the inner washer perimeter.

3. The gripping washer of claim 2, wherein deformable arm has an arm pliability and the gripping tip has a tip pliability less than the arm pliability.

4. The gripping washer of claim 2, wherein the deformable arm and the gripping tip have uniform pliability.

5. The gripping washer of claim 1, wherein the washer body includes one or more recess arcs formed in the inner washer perimeter, and at least one of the elastomeric gripping tabs is positioned within one of the one or more recess arcs.

6. The gripping washer of claim 5, wherein the one or more recess arcs form deformation wells within the inner washer perimeter, and the one or more elastomeric gripping tabs are deformed and fit within the deformation wells when the gripping washer is in a fastened configuration.

7. The gripping washer of claim 5, wherein the fastener hole includes a plurality of facets, and each of the one or more recess arcs is positioned between two of the plurality of facets.

8. The gripping washer of claim 1, wherein the one or more elastomeric gripping tabs are adjacent to the first rigid support surface and remote from the second rigid support surface.

9. The gripping washer of claim 1, wherein the one or more elastomeric gripping tabs are positioned within the inner washer perimeter equidistant from the first and second rigid support surfaces.

10. The gripping washer of claim 1, wherein the washer body consists essentially of one of the following: a flat washer body, a conical washer body, a wave washer body, a curved-disc washer body, a one piece spherical washer body, a two piece spherical washer body and a locking washer body.

11. The gripping washer of claim 1, wherein the one or more elastomeric gripping tabs are molded into the inner washer perimeter.

12. A gripping washer comprising:
   a washer body constructed with a first material, the washer body includes:
      first and second rigid support surfaces, and
      a fastener hole extending between the first and second rigid support surfaces, an inner washer perimeter extending around the fastener hole;
   a gripping assembly within the fastener hole, the gripping assembly is configured for gripping of a portion of a fastener within the fastener hole, the gripping assembly includes one or more elastomeric gripping tabs coupled with the inner washer perimeter, the one or more elastomeric gripping tabs constructed with a second material that is pliable relative to the first material of the washer body; and
   the shape of the one or more elastomeric gripping tabs differs between a gripping configuration and a fastened configuration:
      in the gripping configuration, the one or more elastomeric gripping tabs are engaged along a fastener and the elastomeric gripping tabs are deflected and extend outside of the fastener hole, and
      in the fastened configuration, the one or more elastomeric gripping tabs are deformed from the gripping configuration and positioned entirely within the fastener hole.

13. The gripping washer of claim 12, wherein the shape of the one or more elastomeric gripping tabs differs between an uninstalled configuration, a gripping configuration and a fastened configuration, and in the uninstalled configuration, the one or more elastomeric gripping tabs are planar and substantially perpendicular to a plane coextensive with the fastener hole.

14. The gripping washer of claim 12, wherein the washer body includes one or more deformation wells for one or more of the elastomeric gripping tabs, the one or more deformation wells are within the fastener hole and the one or more elastomeric gripping tabs are positioned within the one or more deformation wells, and the one or more deformation wells receive the deformed elastomeric gripping tabs when in the fastened configuration.

15. The gripping washer of claim 14, wherein the deformation wells have a well volume greater than or equal to the volume of the one or more elastomeric gripping tabs positioned respectively within the deformation wells.

16. The gripping washer of claim 14, wherein the inner washer perimeter includes one or more recess arcs for each of the one or more deformation wells and each recess arc forms a perimeter for one of the one or more deformation wells.

17. The gripping washer of claim 12, wherein the washer body has a washer thickness and the one or more elastomeric tabs have a tab thickness, and the tab thickness is less than the washer thickness.

18. The gripping washer of claim 12, wherein the washer body has a washer thickness and the one or more elastomeric tabs have a tab thickness, and the tab thickness is equal to the washer thickness.

19. The gripping washer of claim 12, wherein the washer body includes a plurality of facets extending along portions of the inner washer perimeter, the plurality of facets are configured to center a fastener within the fastener hole.

20. The gripping washer of claim 19, wherein each elastomeric gripping tab is provided within a recess arc between two adjacent facets.

21. The gripping washer of claim 19, wherein the fastener hole has a substantially triangular shape and three facets.

22. A gripping washer comprising:
   one or more elastomeric gripping tabs coupled with an inner washer perimeter and extending inwardly into a fastener hole from an inner washer perimeter, the inner washer perimeter including a first material and the one or more elastomeric gripping tabs including a second material that is pliable relative to the first material,
   wherein the one or more elastomeric gripping tabs are configured to be deformed during fastening with a work piece to fill a portion of the fastener hole, and
   wherein the deformed elastomeric gripping tabs are configured to be retained within the inner washer perimeter after fastening.

23. The gripping washer of claim 22, wherein the washer body includes one or more deformation wells for one or more of the elastomeric gripping tabs, the one or more deformation wells are within the fastener hole and the one or more elastomeric gripping tabs are positioned within the one or more deformation wells, and the one or more deformation wells receive the deformed elastomeric gripping tabs when in a fastened configuration.

24. The gripping washer of claim 22, wherein the washer body includes a plurality of facets extending along portions of the inner washer perimeter, the plurality of facets are configured to center a fastener within the fastener hole.

25. The gripping washer of claim 24, wherein each elastomeric gripping tab is provided within a recess arc between two adjacent facets.

26. A gripping washer comprising:
   a washer body, the washer body includes:
      first and second rigid support surfaces,
      a fastener hole extending between the first and second rigid support surfaces,
   an inner washer perimeter extending around the fastener hole, and
      one or more recess arcs formed in the inner washer perimeter; and
   one or more elastomeric gripping tabs coupled with the inner washer perimeter, the one or more elastomeric gripping tabs extend inwardly into the fastener hole from the inner washer perimeter, and at least one of the elastomeric gripping tabs is positioned within one of the one or more recess arcs.

27. The gripping washer of claim 26, wherein the one or more elastomeric gripping tabs each include:
   a deformable arm coupled with the inner washer perimeter, and
   a gripping tip at an end of the deformable arm and spaced inward from the inner washer perimeter.

28. The gripping washer of claim 27, wherein the deformable arm has an arm pliability and the gripping tip has a tip pliability less than the arm pliability.

29. The gripping washer of claim 27, wherein the deformable arm and the gripping tip have uniform pliability.

30. The gripping washer of claim 26, wherein the one or more recess arcs form deformation wells within the inner washer perimeter, and the one or more elastomeric gripping tabs are deformed and fit within the deformation wells when the gripping washer is in a fastened configuration.

31. The gripping washer of claim 26, wherein the fastener hole includes a plurality of facets, and each of the one or more recess arcs is positioned between two of the plurality of facets.

32. The gripping washer of claim 26, wherein the one or more elastomeric gripping tabs are adjacent to the first rigid support surface and remote from the second rigid support surface.

33. The gripping washer of claim 26, wherein the one or more elastomeric gripping tabs are positioned within the inner washer perimeter equidistant from the first and second rigid support surfaces.

34. The gripping washer of claim 26, wherein the washer body consists essentially of one of the following: a flat washer body, a conical washer body, a wave washer body, a curved-disc washer body, a one piece spherical washer body, a two piece spherical washer body and a locking washer body.

35. The gripping washer of claim 26, wherein the one or more elastomeric gripping tabs are molded into the inner washer perimeter.

36. The gripping washer of claim 26, wherein the washer body includes a first material, and the one or more elastomeric gripping tabs includes a second material that is pliable relative to the first material.

* * * * *

UNITED STATES PATENT AND TRADEMARK OFFICE
CERTIFICATE OF CORRECTION

| | | |
|---|---|---|
| PATENT NO. | : 8,616,818 B2 | Page 1 of 1 |
| APPLICATION NO. | : 13/029744 | |
| DATED | : December 31, 2013 | |
| INVENTOR(S) | : Robert D. Travis | |

It is certified that error appears in the above-identified patent and that said Letters Patent is hereby corrected as shown below:

In the drawings,

Sheet 6 of 6, Fig. 11, reference numeral 1104, line 2, delete "ELASTMETRIC" and insert --ELASTOMERIC--, therefor Sheet 6 of 6, Fig. 11, reference numeral 1104, line 3, delete "PARIMETER" and insert --PERIMETER--, therefor In the specification, In column 1, line 58, delete "fastener" and insert --fasten--, therefor In column 8, line 67, delete "washers" and insert --washer--, therefor In column 20, line 22, delete "examples;" and insert --examples,--, therefor Signed and Sealed this
Ninth Day of August, 2016

Michelle K. Lee
*Director of the United States Patent and Trademark Office*